United States Patent
Mosko

(10) Patent No.: US 11,956,135 B2
(45) Date of Patent: Apr. 9, 2024

(54) NETWORK MEASUREMENT IN AN ENTERPRISE ENVIRONMENT

(71) Applicant: Palo Alto Research Center Incorporated, Palo Alto, CA (US)

(72) Inventor: Marc E. Mosko, Santa Cruz, CA (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/183,547

(22) Filed: Nov. 7, 2018

(65) Prior Publication Data

US 2020/0145311 A1    May 7, 2020

(51) Int. Cl.
| | |
|---|---|
| *H04L 43/0882* | (2022.01) |
| *G06F 9/54* | (2006.01) |
| *H04L 41/0893* | (2022.01) |
| *H04L 41/50* | (2022.01) |
| *H04L 41/5009* | (2022.01) |

(Continued)

(52) U.S. Cl.
CPC .......... *H04L 43/0882* (2013.01); *G06F 9/546* (2013.01); *H04L 41/0893* (2013.01); *H04L 41/5009* (2013.01); *H04L 41/509* (2013.01); *H04L 43/0888* (2013.01); *H04L 43/50* (2013.01)

(58) Field of Classification Search
CPC ............. H04L 41/0893; H04L 41/5009; H04L 41/509; H04L 43/0888; H04L 43/50; H04L 43/0882; G06F 9/546
See application file for complete search history.

(56) References Cited

U.S. PATENT DOCUMENTS

| | | | |
|---|---|---|---|
| 7,860,918 B1 | 12/2010 | Baldonado et al. | |
| 8,146,143 B1 * | 3/2012 | Emigh ................ | H04L 67/1068 |
| | | | 726/6 |

(Continued)

FOREIGN PATENT DOCUMENTS

| | | | |
|---|---|---|---|
| CN | 102045219 A | * | 12/2010 |
| CN | 102045219 A | * | 5/2011 |
| CN | 102045219 A | * | 5/2011 |

OTHER PUBLICATIONS

Olivia2009, Windows printer, Sep. 2011, https://community.spiceworks.com/topic/174966-print-history (Year: 2011).*

(Continued)

*Primary Examiner* — John A Follansbee
*Assistant Examiner* — Fadi Haj Said
(74) *Attorney, Agent, or Firm* — Shun Yao; Yao Legal Services, Inc.

(57) ABSTRACT

Embodiments described herein provide a system for facilitating dynamic content distribution in an enterprise environment. During operation, the system determines a set of logical groups based on a set of grouping criteria. A respective logical group can include one or more devices managed by a controller and a network that provides connections among the one or more devices. The system categorizes the set of logical groups based on exogenous information associated with a respective logical group and determines a corresponding condition of measurement for a respective category of links in the enterprise environment. The system then schedules a link for measurement based on the condition of measurement and the categorization of the set of logical groups.

18 Claims, 16 Drawing Sheets

(51) Int. Cl.
H04L 43/0888 (2022.01)
H04L 43/50 (2022.01)

(56) References Cited

U.S. PATENT DOCUMENTS

| | | | |
|---|---|---|---|
| 8,935,332 B2 * | 1/2015 | Mallet | G06F 15/17306 |
| | | | 709/204 |
| 2004/0006614 A1 | 1/2004 | Difalco | |
| 2004/0073596 A1 * | 4/2004 | Kloninger | H04L 67/16 |
| | | | 709/200 |
| 2007/0198678 A1 * | 8/2007 | Dieberger | H04L 41/0893 |
| | | | 709/223 |
| 2008/0115167 A1 * | 5/2008 | Hermsmeyer | H04L 67/2885 |
| | | | 725/46 |
| 2011/0292803 A1 * | 12/2011 | Nishioka | H04L 1/0003 |
| | | | 370/236 |
| 2013/0159525 A1 * | 6/2013 | Koike | H04L 67/32 |
| | | | 709/225 |
| 2018/0114249 A1 * | 4/2018 | Malkin | G06Q 30/0261 |

OTHER PUBLICATIONS

Olivia3009, Windows Server, Dec. 2011, (Year: 2011).*
Scott, AWS Global Infrastructure: availability Zones, Regions, Edge Locations, Regional Edge Caches, Amazon.com (Year: 2017).*

\* cited by examiner

NETWORK MEASUREMENT IN AN ENTERPRISE ENVIRONMENT

RELATED APPLICATION

The present disclosure is related to U.S. patent application Ser. No. 16/156,565, titled "Dynamic Content Distribution in an Enterprise Network," by inventor Marc E. Mosko, filed 10 Oct. 2018, the disclosure of which is incorporated by reference herein.

BACKGROUND

Field

This disclosure is generally related to the field of content distribution. More specifically, this disclosure is related to a system and method for performing network measurement in an enterprise environment for efficiently distributing content.

Related Art

The proliferation of the Internet and e-commerce continues to create a vast amount of digital content. An enterprise or large corporation may include a network of managed devices, such as cloud storage devices and printers, distributed across multiple sites. In such a network of devices, a device manager may manage (e.g., configure and control) the devices in a local network of one of the sites. This device manager can be responsible for firmware updates, policy file distribution, or data transfers. These operations typically involve large file transfers to a large number of managed devices within the enterprise network.

A conventional device manager typically manages devices based on, e.g., a Simple Network Management Protocol (SNMP) query, which is based on the Internet Protocol (IP) addresses of the managed devices. However, each device can be assigned an IP address by a Dynamic Host Configuration Protocol (DHCP) server based on a local address pool (e.g., from a set of private IP addresses). To facilitate access to the devices in a private network, the device manager conventionally resides within the same network, such as the same private IP sub-network and the local area network (LAN). However, with large enterprises, the device manager may need to distribute large files across multiple subnets.

The device manager typically uses the existing networking framework and protocols to enable large-scale file distribution within the enterprise network. However, such solutions are directed toward topology-aware peer-to-peer content distribution solutions. These solutions estimate the network conditions between the participants to find suitable candidates for a specific file. These solutions, however, usually do not plan the distribution of a file. As a result, the file may be distributed in the network based on demand. In particular, since these solutions are for the Internet, they are designed for widely distributed participants with minimum topological correlation. Sometimes a particular file might have a flash popularity and create a temporal interest correlation, but the topological correlation remains disperse. Therefore, these solutions may not serve an enterprise environment, which can have a high degree of topological and temporal correlation for planned use, such as firmware updates or operating system patches.

SUMMARY

Embodiments described herein provide a system for facilitating dynamic content distribution in an enterprise environment. During operation, the system determines a set of logical groups based on a set of grouping criteria. A respective logical group can include one or more devices managed by a controller and a network that provides connections among the one or more devices. The system categorizes the set of logical groups based on exogenous information associated with a respective logical group and determines a corresponding condition of measurement for a respective category of links in the enterprise environment. The system then schedules a link for measurement based on the condition of measurement and the categorization of the set of logical groups.

In a variation on this embodiment, the set of logical groups is categorized into a first category corresponding to a subset of logical groups within a threshold distance to the controller and a second category corresponding to a subset of logical groups outside of the threshold distance to the controller.

In a variation on this embodiment, the exogenous information includes one or more of: time zone information, language and any other locale information, Internet Protocol (IP) subnet information, routing protocol information, and service information.

In a variation on this embodiment, the system selects one or more group heads for a respective logical group of the set of logical groups. The inter-group connections between a first and a second logical group are formed between the respective group heads of the first and second logical groups.

In a variation on this embodiment, the categories of a link include one or more of: a link from a random logical group to a source logical group, a loop in a random logical group, a link between two distinct random logical groups, and a link between two categories of logical groups.

In a variation on this embodiment, the condition of measurement is based on a probability of scheduling a link in a respective category of links.

In a variation on this embodiment, the system obtains the exogenous information associated with a respective device managed by the controller by using message queue (MQ)-based message exchanges.

In a variation on this embodiment, the system performs the scheduled link measurement by sending a set of packets of different sizes via the link and determining one or more performance parameters of the link based on a set of response packets corresponding to the set of packets.

In a further variation, the system obtains information from the set of response packets. If the system has received a minimum number of response packets, the system calculates a moving average of obtained information to determine the performance parameters.

In a variation on this embodiment, the exogenous information is encrypted using a privacy-preserving transformation such that the controller can find a size of set unions between two devices' exogenous information without learning the exogenous information.

BRIEF DESCRIPTION OF THE FIGURES

In the figures, like reference numerals refer to the same figure elements.

DETAILED DESCRIPTION

Figure 1A:
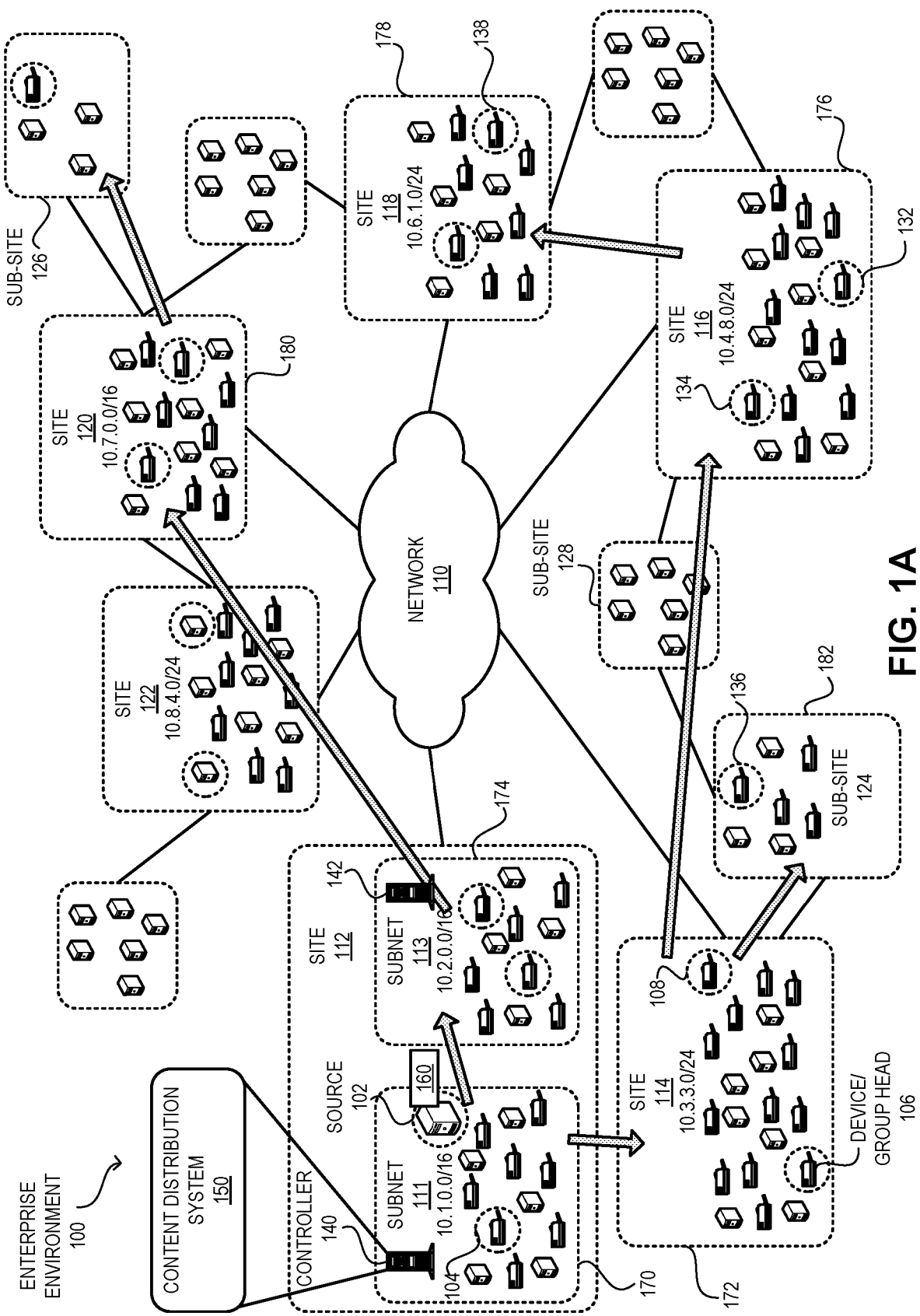
FIG. 1A illustrates an exemplary enterprise environment supporting network measurement for efficient content distribution, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of efficiently measuring a network in an enterprise environment for content distribution by determining which links to measure based on (i) exogenous information, and (ii) link categorization.

With existing technologies, a source device (e.g., a device manager) distributes large pieces of content via point-to-point communication to a receiving device (e.g., a managed device). If a piece of content, such as a firmware update, is sent to a large number of receiving devices, this process is repeated for each receiving device. Such a mode of distribution can cause a large amount of traffic in the networking infrastructure of the enterprise environment. Since each transfer can be an individual transfer between a device pair, each transfer can be vulnerable to failure. As a result, the enterprise environment can face a non-trivial failure rate.

To address this issue, different performance parameters, such as bandwidth, latency, and utilization, for a respective link of the network can be measured. However, if the enterprise environment includes a large network, it can be infeasible to measure these parameters for a respective device pair or device groups for a respective piece of content. In particular, the source device for each piece of content can be different and, hence, may lead to a different distribution plan. As a result, measuring the parameters for each source in a large network can lead to significant computational overhead and bandwidth consumption.

Embodiments described herein solve these problems by providing a content distribution system that can efficiently select the links on which it performs network measurements for planning the distribution of a piece of content. To facilitate the distribution of content in the enterprise network, the system can learn the network topology and determine efficient distribution paths on the network topology for a source device and a set of receiving devices. The system then uses a peer-to-peer protocol over the network topology to distribute a piece of content from the source via the distribution paths. During operation, a respective device in the enterprise environment registers with a controller. The controller is responsible for managing, which can include configuring, updating, and troubleshooting, a respective device. A device managed by the controller can be referred to as a managed device.

To efficiently measure the network topology for a source (or sources), the system first groups receiving devices (i.e., the managed devices that would receive a piece of content from the source) into logical groups based on one or more grouping criteria (e.g., based on Internet Protocol (IP) subnets). The system then selects one or more group heads for a respective group. Based on availability and in the order of priority, the system can select source device, receiving devices, and relay devices as group heads. These group heads provide inter-group links. The logical group comprising the source device can be referred to as the source group and the logical group comprising a controller can be referred to as the controller group. The rest of the groups can be referred to as non-controller groups or regular groups.

The system can then categorize the groups into at least two categories: a category one groups closer to the source group and category two groups further away from the source/controller group. The system may categorize the groups based on the respective distances and/or latencies from the source/controller group. For example, the system can determine whether a logical group is within a threshold distance to the source device to determine whether that logical group should be a category one group. The system can then measure the parameters from one device of a group, which can be a group head, to the source(s). The system can perform fuzzy measurements from the category two groups to the category one groups to improve the paths in the network. However, the system may not know the geometric relationship between two groups.

To efficiently categorize the groups, the system can obtain exogenous information associated with the groups during the registration process. Examples of exogenous information include, but are not limited to, time zone information, language and any other locale information, IP subnet information, routing protocol information, and service information (e.g., whether a device, such as a printer, provides services to other nearby devices). The system can analyze this information to determine candidates for category one groups. For example, the system can determine the IP addresses of devices that access service from a particular device (e.g., print to a printer). In some embodiments, during the registration process, the managed device can use a privacy-preserving transformation (e.g., using homomorphic encryption) such that the controller can find the size of set unions between two devices' exogenous information without learning the information.

If the system is limited in resources and frequencies for the measurement (e.g., only a fraction of the network bandwidth can be used for a limited amount of time), the system can selectively determine a group pair for measurement and select specific devices within those groups to conduct the measurement. The system can randomize the choices at each selection to avoid repeated patterns. The system can assign highest priority to the links toward the source group, which can also be the controller group. During operation, the system, with equal weight, measures (i) from each group to the source group, and (ii) loops within a group that has at least two devices. The system then allocates weights to the chances of picking a link for a particular category of links. In some embodiments, the system considers four categories of links: (i) from a random group to the source group, (ii) a loop in a random group, (iii) between two distinct random regular groups, and (iv) between a category one group and a category two group. Based on the weights, the system determines a probability of measuring a particular category of link (e.g., a condition of measurement), and based on the probability, schedules a link for measurement.

Exemplary System

FIG. 1A illustrates an exemplary enterprise environment supporting network measurement for efficient content distribution, in accordance with an embodiment of the present application. An enterprise environment 100 can be distributed across a number of sites 112, 114, 116, 118, 120, and 122. These sites can be coupled to each other via a network 110, such as a local or a wide area network. The wide area network can be the Internet. The sites can also have direct connection with each other (e.g., with point-to-point optical fiber). A site, such as site 112, can include multiple subnets 111 (e.g., 10.1.0.0/16) and 113 (e.g., 10.2.0.0/16). On the other hand, some other sites, such as site 114 can have one subnet (e.g., 10.3.3.0/24), which may span a sub-site 124 (e.g., a nearby smaller site under the same management). Similarly, site 120 can have one subnet (e.g., 10.7.0.0/16), which may span a sub-site 126. It should be noted that sub-sites 124 and 126 can also maintain their own sub-nets.

With existing technologies, in environment 100, a source device 102 distributes large pieces of content via point-to-point communication to a receiving device. If a piece of content, such as a firmware update, is sent to a large number of receiving devices across the sites of enterprise environment 100, this process is repeated for each receiving device in each site. Such a mode of distribution can cause a large amount of traffic in network 110 of enterprise environment 100. In addition, since each transfer can be an individual transfer between a device pair, each transfer can be vulnerable to failure. As a result, enterprise environment 100 can face a non-trivial failure rate.

To solve this problem, a content distribution system 150 can efficiently select the links on which system 150 performs network measurements for planning the distribution of a piece of content 160. System 150 can facilitate a security framework, a control framework, and a data transfer framework. The security framework can provide security to both the control channel and the data channel. A distinguished node 140 can be responsible for controlling the system and is thus called controller 140. In some embodiments, system 150 can be hosted on controller 140. Enterprise environment 100 can include a plurality of controllers 140 and 142, which can facilitate high availability to each other. Controller 140 can authenticate messages (e.g., using a public key system and/or a symmetric key exchange).

To facilitate the distribution of content 160 in network 110, system 150 can learn the topology of network 110 and determine efficient distribution paths on the topology for a source device 102 of content 160 and a set of receiving devices. System 150 then uses a peer-to-peer protocol over the network topology to distribute content 160 from source device 120 via the distribution paths in network 110. During operation, a respective device in enterprise environment 100 registers with controller 140, which is responsible for managing, which can include configuring, updating, and troubleshooting, a respective device. A device managed by controller 140 can be referred to as a managed device.

Controller 140 can notify each managed device in enterprise environment 100 regarding which piece of content to request. Controller 140 can also notify a respective managed device of a timeframe for content 160 (e.g., when to request and where to request from). Managed devices can be configured with a priority value that indicates a priority for the request. For example, the priority can indicate which source device the managed device should request a piece of content from first. In some embodiments, controller 160 organizes a set of managed devices into a logical group based on one or more grouping criteria. Examples of a grouping criterion include, but are not limited to, an IP subnet, a local area network, and a spanning tree in a layer-2 network.

To distribute content 160, controller 140 can generate a distribution tree that includes a logical group as a node of the tree. In this example, a respective site or sub-site is represented as a logical group and a highlighted arrow depicts each branch of the tree. Since site 112 has two subnets 111 and 113, they can be two different nodes on the tree. If a site or sub-site, such as sub-site 128, of enterprise environment 100 does not include a recipient for content 160, that sub-site is not included in the tree. Each group can include one or more group heads (denoted with dashed circles) responsible for obtaining the piece of content from an upstream node (i.e., the parent node of the tree).

The group corresponding to subnet 111 can be group 170, which include source device 102 and managed device 104 as group heads. Since group 170 includes source device 102, group 170 can be referred to as a source group. Similarly, since group 170 includes controller 140, group 170 can also be referred to as a controller group. The non-controller/non-source groups can be referred to as regular groups. It should be noted that logical group 174 corresponding to subnet 113 can also be referred to as a controller group. Logical group 172 corresponding to site 114 can include devices 106 and 108 as group heads. Logical group 176 corresponding to site 116 can include devices 132 and 134 as group heads. Hence, devices 102, 104, 106, 108, 132, and 134 can be referred to as group heads as well. The root of the tree in this example is subnet 111, which includes source device 102 hosting content 160. It should be noted that controller 140 can plan a distribution tree for each piece of content, which can vary (e.g., based on source device and receiving devices).

In some embodiments, controller 140 can calculate a Steiner tree (e.g., a minimum-cost tree) to generate the inter-group distribution tree. In enterprise environment 100, some devices can be receiving devices (e.g., a recipient of content 160) and the other devices can operate as relay devices or dormant devices. The Steiner tree can span all receiving devices, if needed, using some relay devices, to find the minimum-cost tree. Controller 140 can calculate a minimum-cost tree using a combination of shortest paths. Controller 140 can determine the shortest paths from each receiving device to the source device in enterprise environment 100 using the topography information of enterprise environment 100. Controller 140 then determines the minimum cost single source directed spanning tree from all receiving devices to source device 102.

Group heads are responsible for inter-group data transfer. Group heads 106 and 108 can be logically coupled to upstream group heads 102 and 104. Similarly, group heads 132 and 134 can be logically coupled to upstream group heads 106 and 108. If a logical group does not have a sufficient number of receiving devices for content, that logical group may not have multiple group heads. For example, logical group 182 corresponding to sub-site 124 can include one group head 136. For efficient distribution, controller 140 can divide content 160 into a number of blocks (e.g., each with a predefined number of data chunks of fixed size). Group head 106 can obtain a subset of the blocks from upstream group heads 102 and/or 104, and the rest of the blocks from peer group head 108.

Controller 140 can determine the topography information of enterprise environment 100 based on one or more of: a user input and network discovery using measurements. To efficiently measure the network topology for source device 102, system 150 can then categorize the regular groups into at least two categories: category one groups closer to source/controller group 170 and category two groups further away from source/controller group 170. In some embodiments, system 150 can determine that groups 172 and 174 are category one groups because they are within a threshold distance of source/controller group 170.

On the other hand, groups 176, 178, and 180 corresponding to sites 116, 118, and 120, respectively, can be in category two groups. System 150 can then measure parameters, such as bandwidth, latency, and utilization, of a link associated with one device of a group to source device 102. System 150 can perform fuzzy measurements from the category two groups to the category one groups to improve the paths in network 110. For example, instead of measuring every group pair in network 110, system 150 can measure the link that leads from group 176 to group 172.

If system 150 is limited in resources and frequencies for the measurement (e.g., only a fraction of the network bandwidth can be used for a limited amount of time), system 150 can selectively determine a group pair for measurement and select specific devices within those groups to conduct the measurement. System 150 can randomize the choices at each selection to avoid repeated patterns. System 150 can assign highest priority to the links toward source/controller group 170. Subsequently, system 150, with equal weight, measures (i) from each group to source group 170, and (ii) loops within a group that has at least two devices (e.g., group 172). System 150 then allocates weights to the chances of picking a link for a particular category of links.

In some embodiments, system 150 considers four categories of links: (i) from a random group to source group 170, (ii) a loop in a random group (e.g., group 176), (iii) between two distinct random regular groups (e.g., between groups 176 and 178), and (iv) between a category one group and a category two group (e.g., between groups 172 and 176). Based on the weights, system 150 determines a probability of measuring a particular category of link, and based on the probability, schedules a link for measurement. To measure a link, controller 140 can instruct the corresponding devices to send a series of packets of different lengths a number of times via the link. Controller 140 determines the minimum response time for each packet size and calculates the linear regression on those values. Controller 140 also determines the bandwidth in bits per second and the round-trip time is in seconds. Controller 140 can aggregate multiple measurements via an exponential moving average to determine the bandwidth of a link.

Figure 1B:
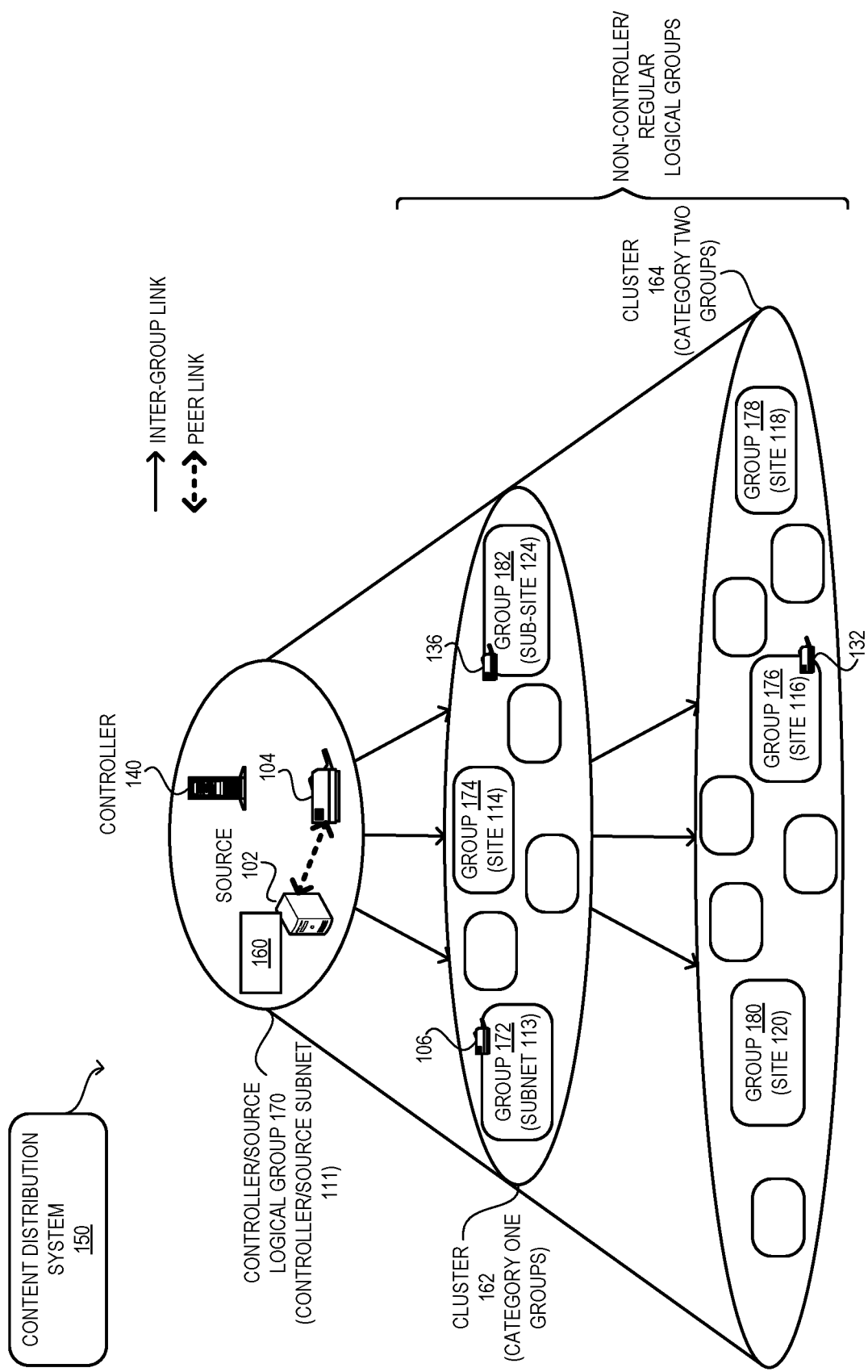
FIG. 1B illustrates exemplary clustering of logical groups for facilitating network measurement in an enterprise environment, in accordance with an embodiment of the present application.

FIG. 1B illustrates exemplary clustering of logical groups for facilitating network measurement in an enterprise environment, in accordance with an embodiment of the present application. To efficiently categorize the groups, the system can obtain exogenous information associated with regular groups, such as groups 172, 174, 176, 178, 180, and 182 during the registration process. Examples of exogenous information include, but are not limited to, time zone information, language and any other locale information, IP subnet information, routing protocol information, and service information (e.g., whether a device, such as a printer, provides services to other nearby devices). System 150 can analyze this information to determine candidates for the category one group. Based on the analysis, system 150 can determine that groups 172, 174, and 182 are category one groups, and groups 176, 178, and 180 are category two groups.

In some embodiments, during the registration process, a respective device, such as device 106, can use a privacy-preserving transformation such that controller 140 can find the size of set unions between two devices' exogenous information without learning the information. Device 106 in group 172 and device 136 in group 182 can share one or more of the exogenous properties, based on which controller 140 determines that groups 172, 174, and 182 belong to cluster 162 of category one groups, and groups 176, 178, and 180 belong to cluster 164 of category two groups.

In some embodiments, system 150 selects a category one group and a category two group based on their exogenous information, and performs the measurements between them. Suppose that device 132 is in group 176 that measures a distance of 100 units to source device 102, and device 106 in group 172 and device 136 in group 182 can measure a distance of 50 units to source device 102. Examples of the unit include, but are not limited to, physical distance (e.g., meters), number of hops, and latency. Controller 140 then determines whether to measure a path from device 312 to device 106 or to device 136. If devices 132 and 106 share the same time zone but device 136 is in a different time zone, controller 140 can determine that device 106 is a better choice for scheduling a link for measurement.

In the same way, if devices 132, 106, and 136 are printers on different IP subnets, these devices can record the respective set of user IP addresses that print to each printer. Controller 140 can determine the respective sizes of the set of intersections between the sets of IP addresses recorded by devices 132 and 106, and between the sets of IP addresses recorded by devices 132 and 136. Controller 140 then chooses one device from devices 106 and 136 that corresponds to a larger size. Controller 140 can also determine the network parts of the recorded IP addresses (e.g., the IP subnets) and determine which bits change in the measurements to correlate based on the coarser measure of an IP subnet instead of a specific set of IP addresses.

If a device can overhear routing protocol advertisements, such as multicast or broadcast packets, the device may report a distance vector of the nearby IP subnets to controller 140. Controller 140 can then cluster groups by determining nearby subnets from the distance vectors. For example, devices 106, 132, and 136 can report the list of n closest IP subnets. The values of n can be different for devices 106, 132, and 136. Controller 140 can determine the overlap in these lists. Controller 140 can select device 106 or 136 for a measurement from device 132 based on which device has the most similarity to device 132's list. In some embodiments, controller 140 can adjust the value of n based on an objective, such as a success rate. For example, if the current value of n has a low success rate, controller 140 can increase the value of n, and if the current value of n has a high success rate, controller 140 can decrease the value of n to an optimal value.

System Architecture

Figure 2:
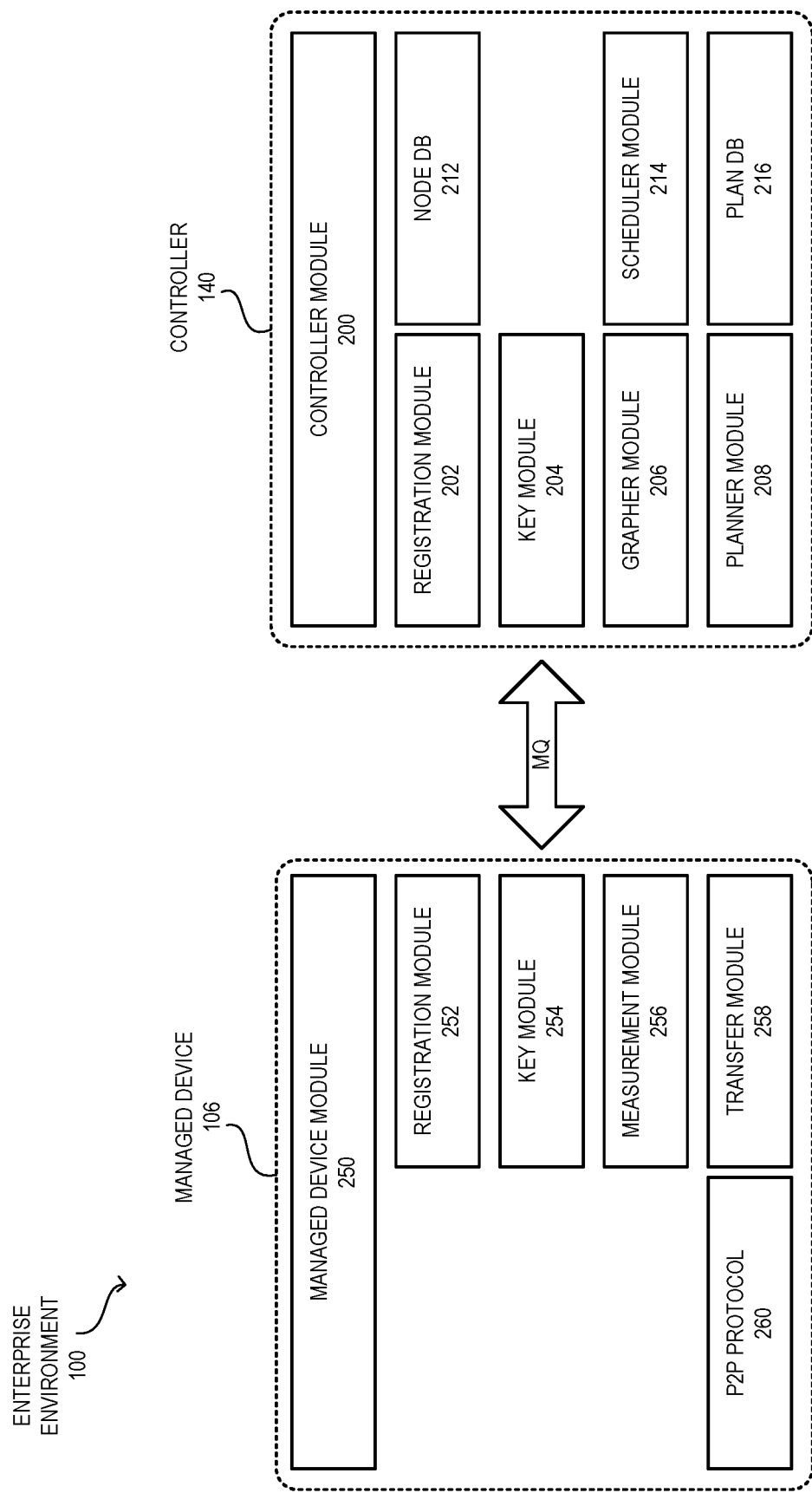
FIG. 2 illustrates an exemplary system architecture that facilitates network measurement in an enterprise environment, in accordance with an embodiment of the present application.

FIG. 2 illustrates an exemplary system architecture that facilitates network measurement in an enterprise environment, in accordance with an embodiment of the present application. In this example, controller 140 and a respective managed device, such as managed device 106, include the principle operational modules controller module 200 and managed device module 250, respectively. Controller module 200 operates based on registration module 202, key module 204, grapher module 206, scheduler module 214, and planner module 208. On the other hand, managed device module 250 can operate based on registration module 252, key module 254, measurement module 256, and transfer module 258.

In controller 140, registration module 202 can listen for registration requests and unregister request messages from managed devices. Based on the requests, registration module 202 maintains information of a current set of devices and subnets in enterprise environment 100 in a node database 212. Key module 204 can listen for key request messages from managed devices and perform key exchange, such as Ephemeral Elliptic Curve Diffie-Hellman, using message queuing. Key module 204 also updates controller 140's keyring with symmetric keys, such as hash-based message authentication code (HMAC). Grapher module 206 can listen for the measurement response messages, and based on these messages, maintains a weighted subnet-to-subnet graph of enterprise environment 100.

Scheduler module 214 periodically schedules measurements between subnets to measure network performance and properties. Scheduler module 214 also maintains a table indicating the edges between the subnets in node database 212. Planner module 208 determines, for a piece of content, the source device and target subnets, which include receiving devices, based on the currently registered devices and schedules experiments to determine a distribution tree. Planner module 208 initiates distribution of the piece of content by generating a distribution plan and storing it in a plan database 216. Planner module 208 can receive notification from the managed devices regarding the distribution.

In managed device 106, registration module 252 sends periodic registration request messages to controller 140 and listens for responses. Key module 254 periodically generates new keys by sending a key exchange request message and listens for corresponding responses. Key module 254 can also update managed device 106's keyring with the symmetric keys (e.g., HMAC). Measurement module 256 can listen for initialization of the network measurement. Based on that, measurement module 256 can schedule network measurement and sends the measurements to grapher module 206. Transfer module 258 listens for a message from controller 140 initializing the distribution of a piece of content and schedules peer-to-peer transfers via a peer-to-peer protocol 260. Transfer module 258 can send the responses to acknowledge the transfer initialization message and notifies controller 140 regarding significant events (e.g., starting, finishing, detection of error, etc.). Protocol 260 performs a peer-to-peer file transfer under the control of planner module 208.

Clustering Operations

Figure 3A:
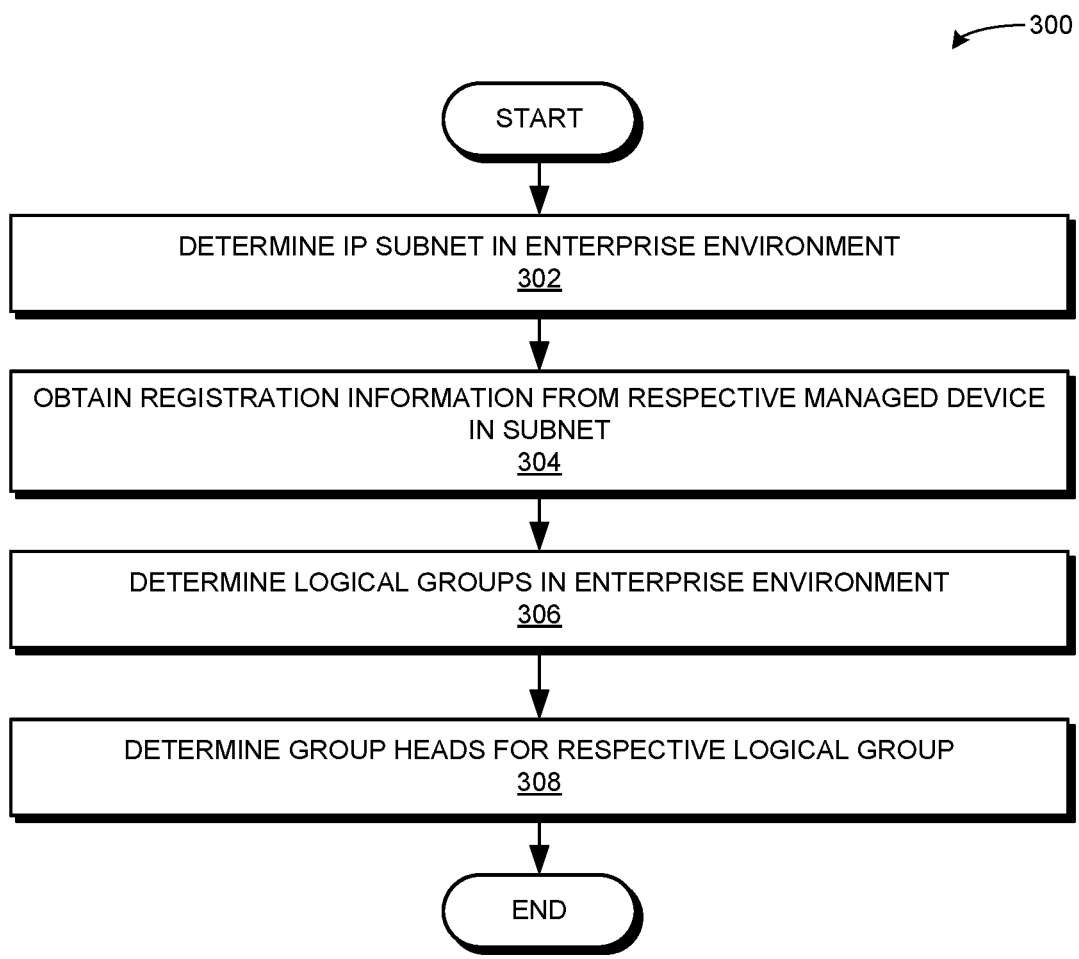
FIG. 3A presents a flowchart illustrating a method of a content distribution system registering managed devices of an enterprise environment, in accordance with an embodiment of the present application.

FIG. 3A presents a flowchart 300 illustrating a method of a content distribution system registering managed devices of an enterprise environment, in accordance with an embodiment of the present application. During operation, the system determines an IP subnet in an enterprise environment (operation 302) and obtains the registration information from a respective managed device in the subnet (operation 304). The system then determines the logical groups in the enterprise environment (operation 306) and determines group heads for a respective logical group (operation 308).

Figure 3B:
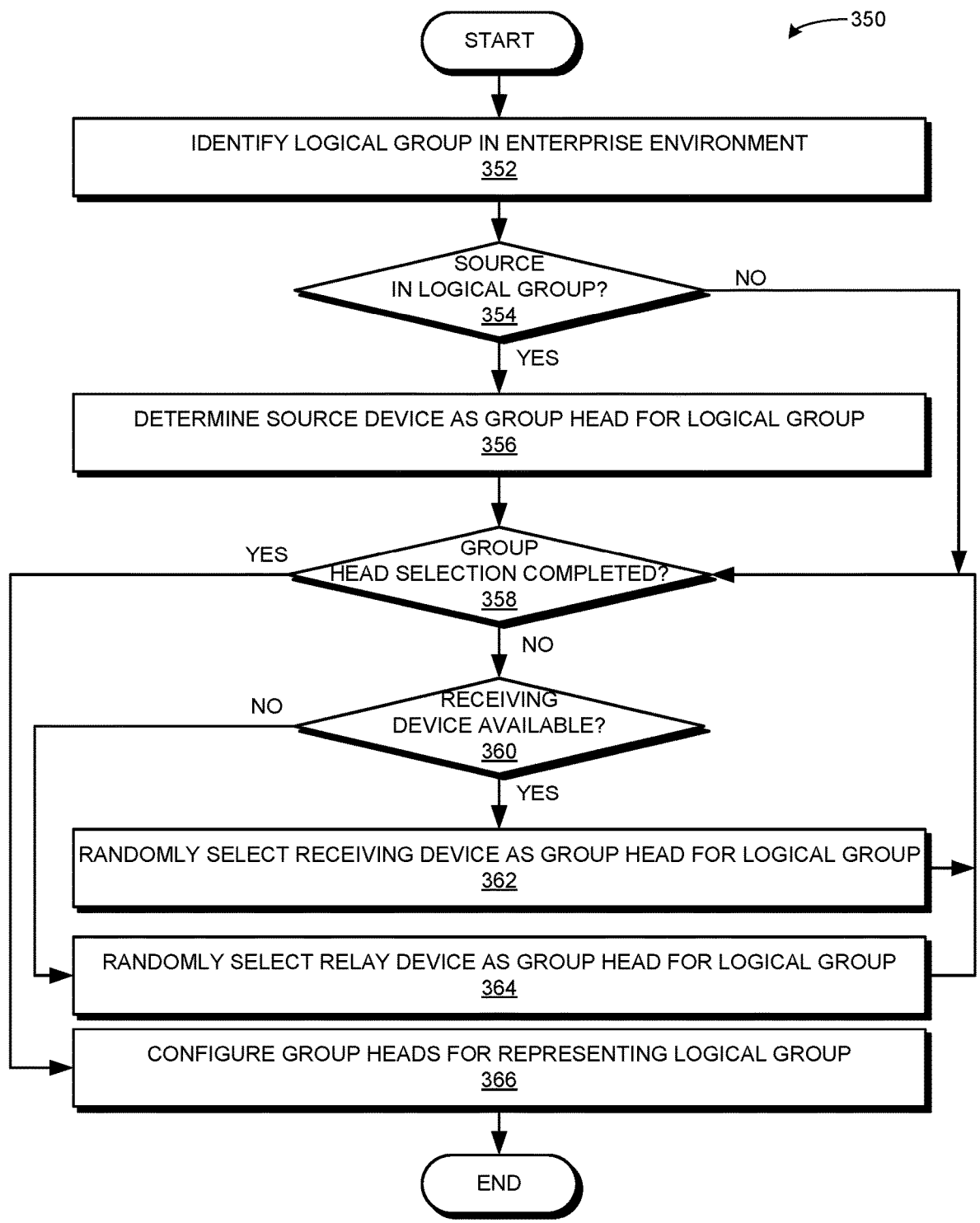
FIG. 3B presents a flowchart illustrating a method of a content distribution system determining group heads for a respective logical group, in accordance with an embodiment of the present application.

FIG. 3B presents a flowchart 350 illustrating a method of a content distribution system determining group heads for a respective logical group, in accordance with an embodiment of the present application. During operation, the system identifies a logical group in the enterprise environment (operation 352) and determines whether the source device of the piece of content is in the logical group (operation 354). If the source device is in the logical group, the system determines the source device as a group head for the logical group (operation 356). The system then determines whether the group head selection has completed (e.g., a predetermined number, such as two, of group heads has been selected or no more devices to select) (operation 358).

If group head selection is not completed, the system checks whether any receiving device for the piece of content is available in the logical group (operation 360). If at least one receiving device is available, the system randomly selects a receiving device as a group head for the logical group (operation 362). Otherwise, the system randomly selects a relay device as a group head for the logical group (operation 364). Upon selecting the group head (operation 362 or 364), the system continues to determine whether the group head selection has completed (operation 358). If group head selection is completed, the system configures the group heads for representing the logical group (operation 366).

Figure 4:
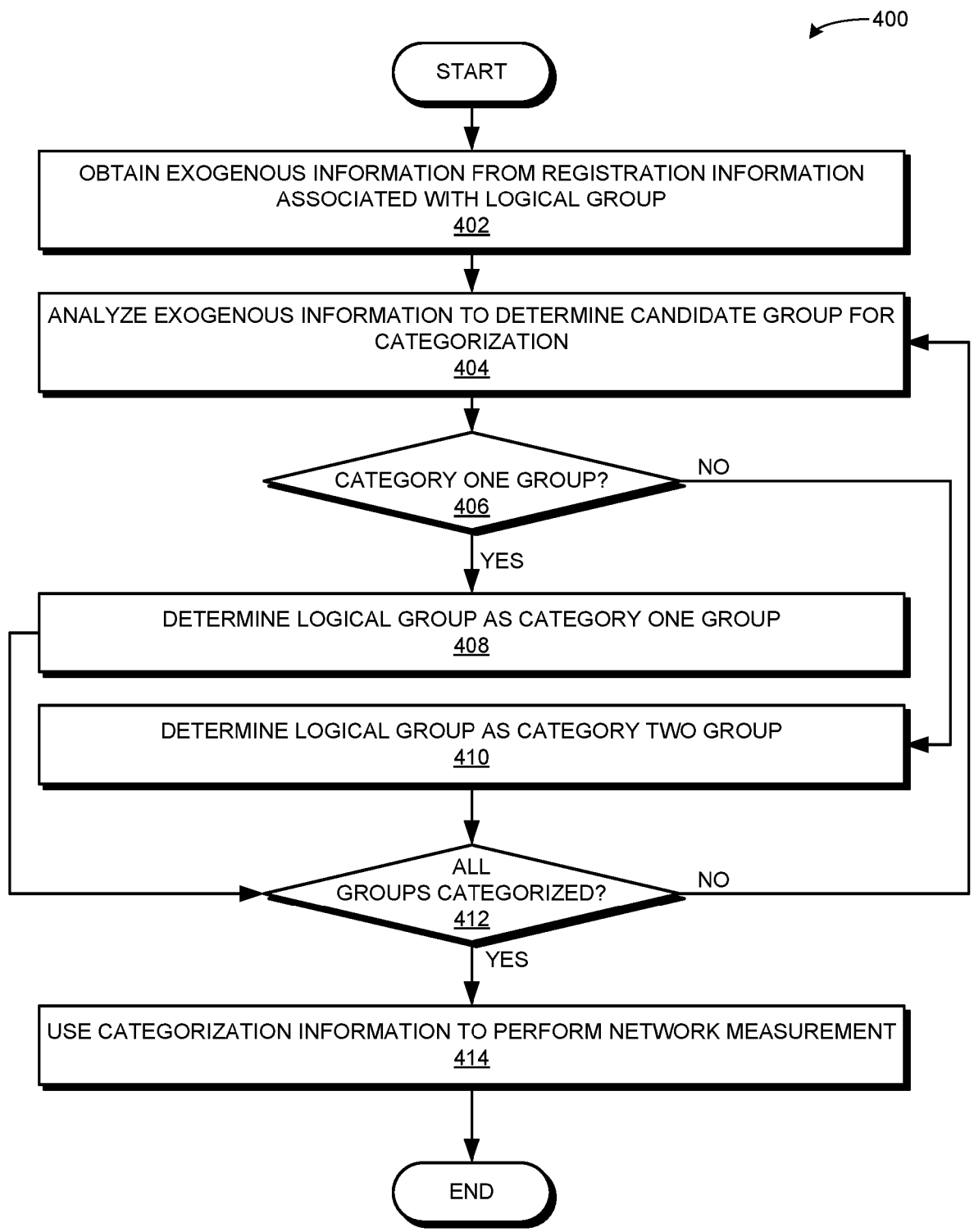
FIG. 4 presents a flowchart illustrating a method of a content distribution system categorizing logical groups based on exogenous information, in accordance with an embodiment of the present application.

FIG. 4 presents a flowchart 400 illustrating a method of a content distribution system categorizing logical groups based on exogenous information, in accordance with an embodiment of the present application. During operation, the system obtains exogenous information from registration information associated with a logical group (operation 402)

and analyzes the exogenous information to determine a candidate group for categorization (operation 404). The system then determines whether the candidate group is a category one group (operation 406). If so, the system determines the candidate group as a category one group (operation 408). Otherwise, the system determines the candidate group as a category two group (operation 410). The system then determines whether all groups have been categorized (operation 412). If all groups have been categorized, the system uses the categorization information to perform network measurements (operation 414). If all groups have not been categorized, the system analyzes the exogenous information to determine the next candidate group for categorization (operation 404).

Scheduling and Measurement Operations

Figure 5A:
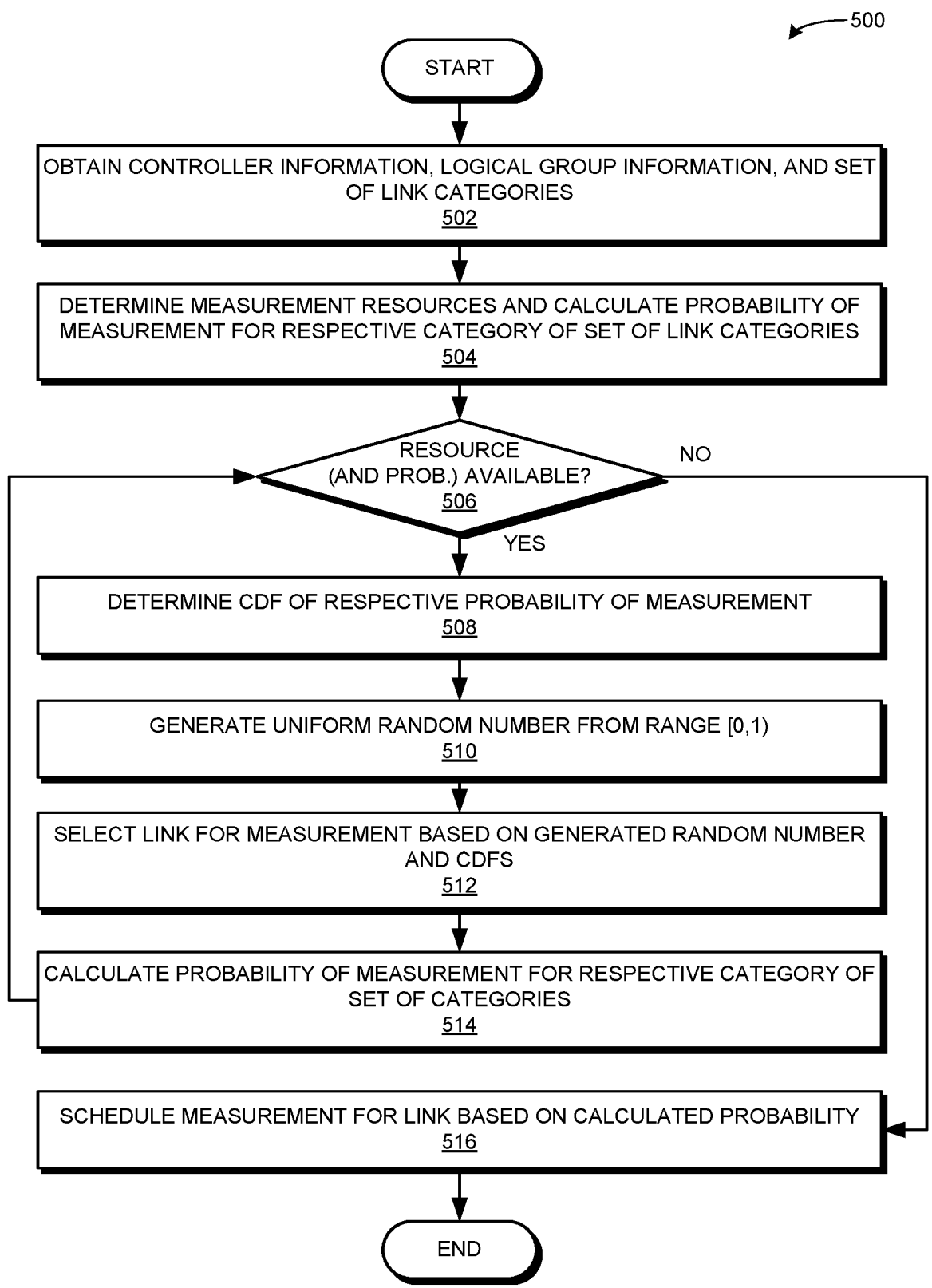
FIG. 5A presents a flowchart illustrating a method of a content distribution system scheduling network measurements, in accordance with an embodiment of the present application.

FIG. 5A presents a flowchart 500 illustrating a method of a content distribution system scheduling network measurements, in accordance with an embodiment of the present application. During operation, the system obtains controller information, logical group information, and a set of link categories (operation 502). The system then determines measurement resources and calculates the probability of measurement (e.g., a condition of measurement) for a respective category of the set of link categories (operation 504). The system checks the availability of resource (and probability) (operation 506). An available probability can indicate a non-zero probability value.

If available, the system determines the cumulative distribution function (CDF) of a respective probability of measurement (operation 508) and generates a uniform random number from a range [0, 1) (operation 510). The system then selects a link for measurement based on the generated random number and the CDFs (operation 512) and calculates the probability of measurement for a respective category of the set of categories (operation 514). The system then continues to check the availability of resource (and probability) (operation 506). If not available, the system schedules a measurement for a link based on the calculated probabilities (operation 516).

Figure 5B:
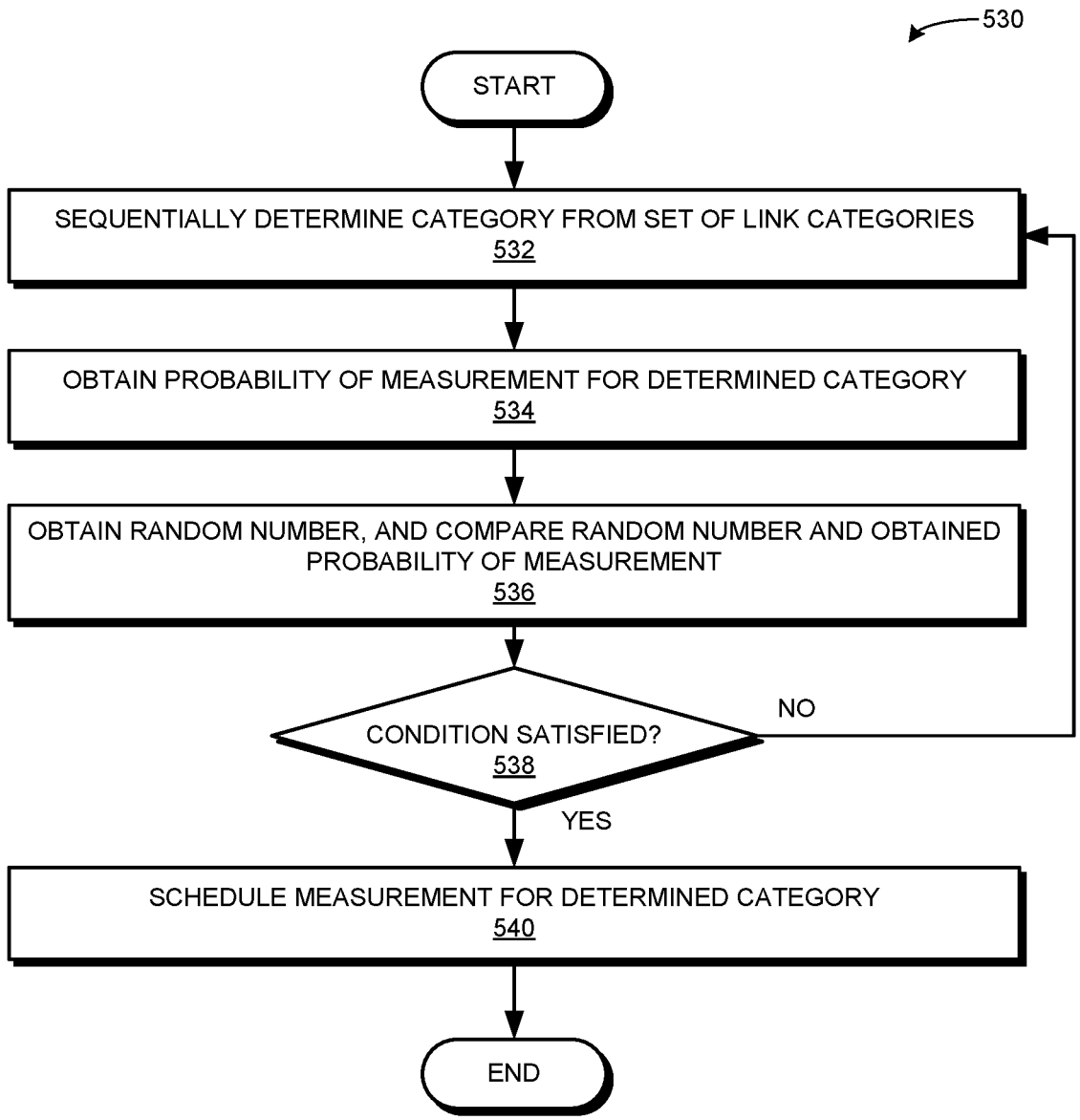
FIG. 5B presents a flowchart illustrating a method of a content distribution system determining whether to initiate measurement for a respective link category, in accordance with an embodiment of the present application.

FIG. 5B presents a flowchart 530 illustrating a method of a content distribution system determining whether to initiate measurement for a respective link category, in accordance with an embodiment of the present application. During operation, the system sequentially determines a category from a set of link categories (operation 532) and obtains the probability of measurement for the determined category (operation 534). The system then obtains the generated random number, as described in conjunction with FIG. 5A, and compares the random number and the obtained probability of measurement (operation 536).

The system then determines whether a condition has been satisfied for the comparison (operation 538). The condition can be whether the random number is larger than the probability. If the condition is satisfied, the system schedules a measurement for the determined category (operation 540). If the condition is not satisfied, the system continues to sequentially determine a category from a set of link categories (operation 532). In some embodiments, the set of link categories include four categories of links: (i) from a random group to the source group, (ii) a loop in a random group, (iii) between two distinct random regular groups, and (iv) between a category one group and a category two group.

Figure 5C:
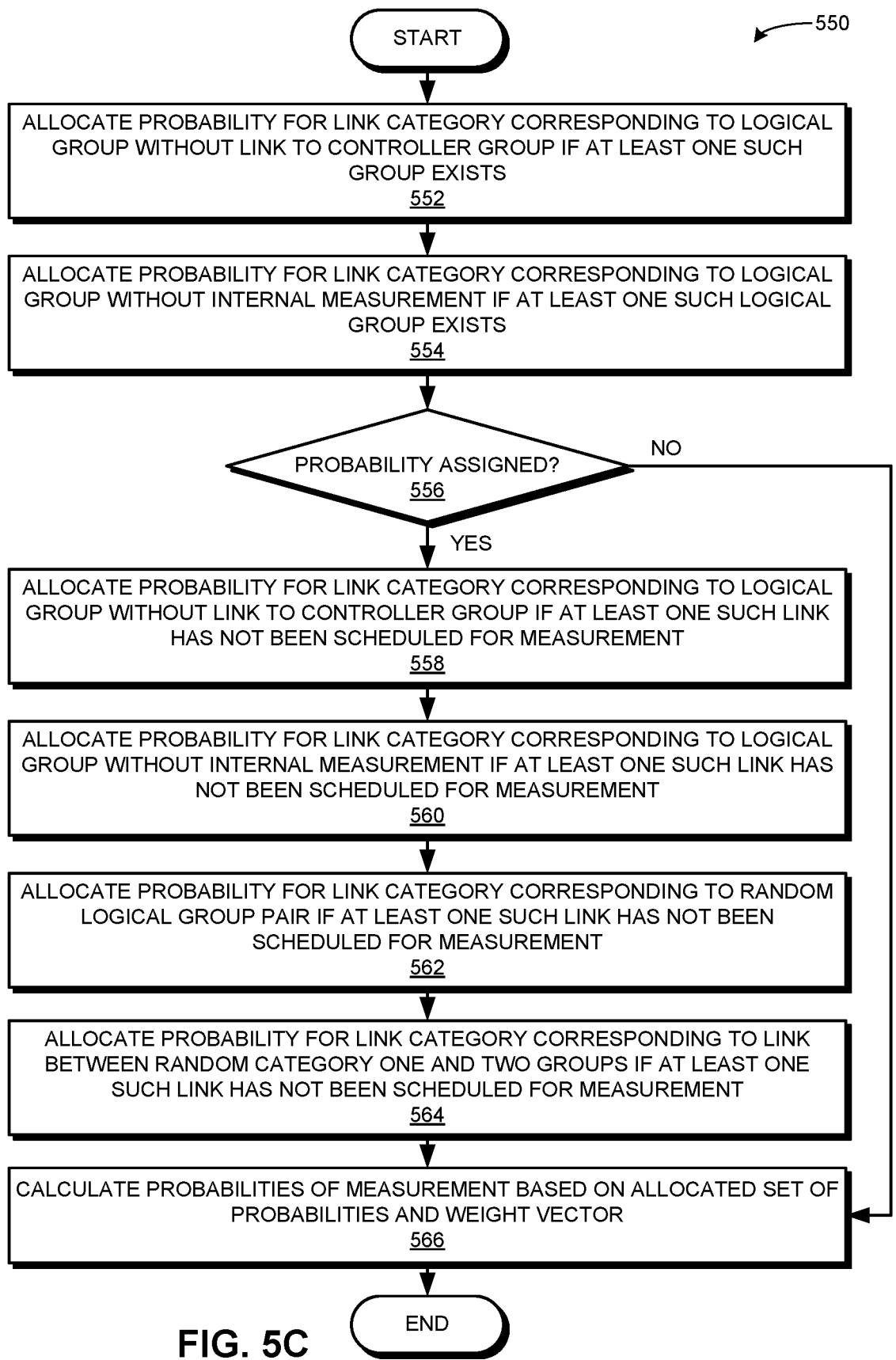
FIG. 5C presents a flowchart illustrating a method of a content distribution system determining a measurement probability for a respective link category, in accordance with an embodiment of the present application.

FIG. 5C presents a flowchart 550 illustrating a method of a content distribution system determining a measurement probability for a respective link category, in accordance with an embodiment of the present application. During operation, the system allocates a probability (e.g., a probability value of 1) for the link category corresponding to a logical group without a link to the controller group if at least one such group exists (operation 552). The existence of the link is checked against currently existing and scheduled links. The system also allocates a probability for the link category corresponding to a logical group without an internal measurement (e.g., a loop) if at least one such group exists (operation 554).

The system then checks whether a probability has been assigned (operation 556). If a probability has been assigned, the system allocates a probability for the link category corresponding to a logical group without a link to the controller group if at least one such link has not been scheduled for measurement (operation 558). The system further allocates a probability for the link category corresponding to a logical group without an internal measurement if at least one such link has not been scheduled for measurement (operation 560). The system also allocates a probability for the link category corresponding to a random logical group pair if at least one such link has not been scheduled for measurement (operation 562).

Moreover, the system allocates a probability for the link category corresponding to a link between random category one and two groups if at least one such link has not been scheduled for measurement (operation 564). If a probability has not been assigned (operation 556) or the probabilities have been allocated for the set of link categories (operation 564), the system calculates the probabilities of measurement based on the allocated set of probabilities and a weight vector (operation 566). In some embodiments, the weight vector is [0.15, 0.15, 0.20, 0.50]. Each value of the vector corresponds to a category of link.

Figure 5D:
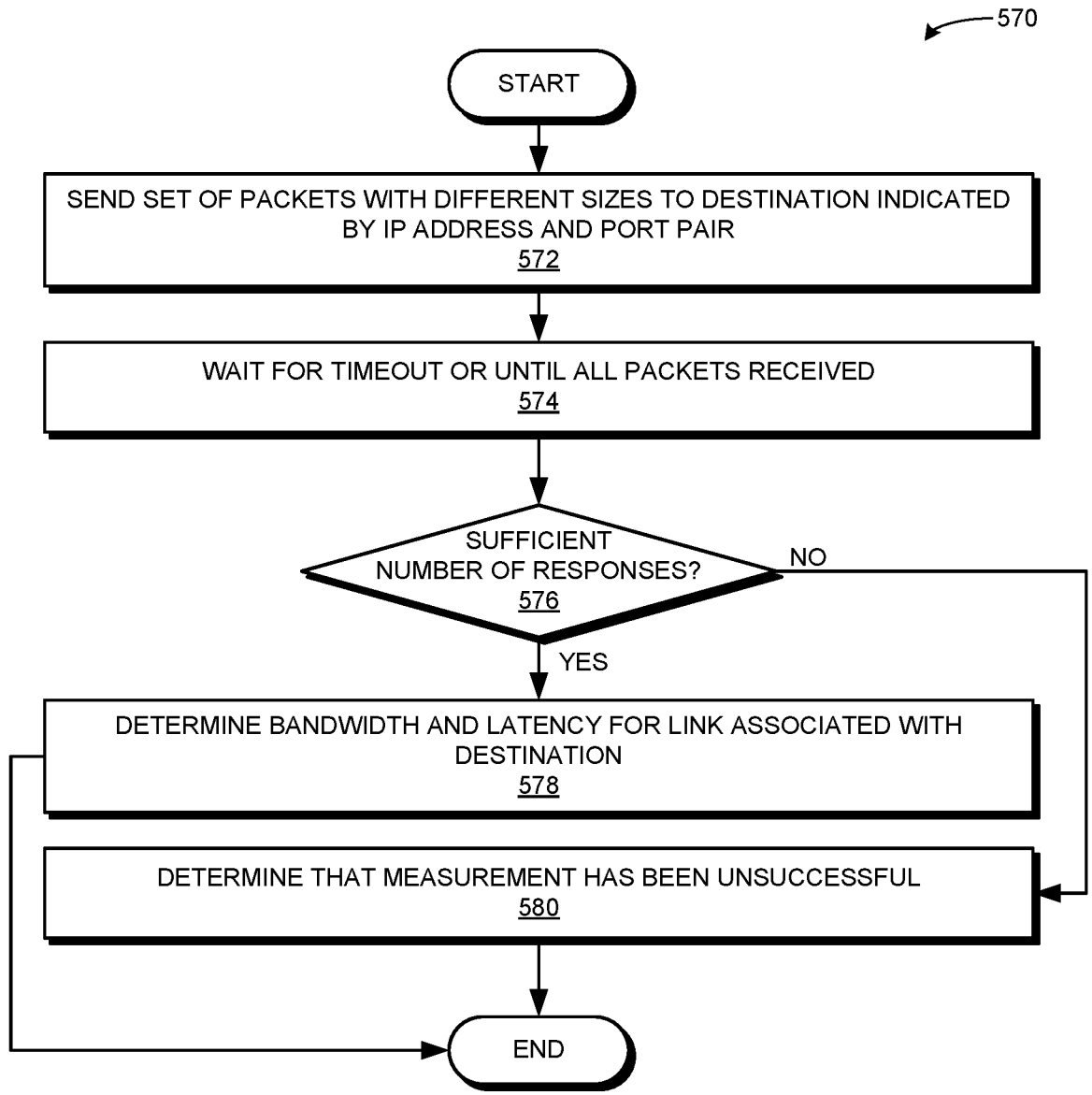
FIG. 5D presents a flowchart illustrating a method of a content distribution system measuring a link, in accordance with an embodiment of the present application.

FIG. 5D presents a flowchart 570 illustrating a method of a content distribution system measuring a link, in accordance with an embodiment of the present application. During operation, the system sends a set of packets with different sizes to a destination indicated by an IP address and a port pair (operation 572). In some embodiments, the system can send three packets, each of sizes 256, 512, 768, and 1024 bytes. Subsequently, the system waits for a timeout or until all packets have been received (operation 574). The system then checks whether a sufficient number of responses have been received (operation 576). If received, the system determines the bandwidth and latency for the link associated with the destination (operation 578). Otherwise, the system determines that the measurement has been unsuccessful (operation 580). In some embodiments, the system uses log return for a scale-free measurement for a comparison among different categories of links.

Figure 6A:
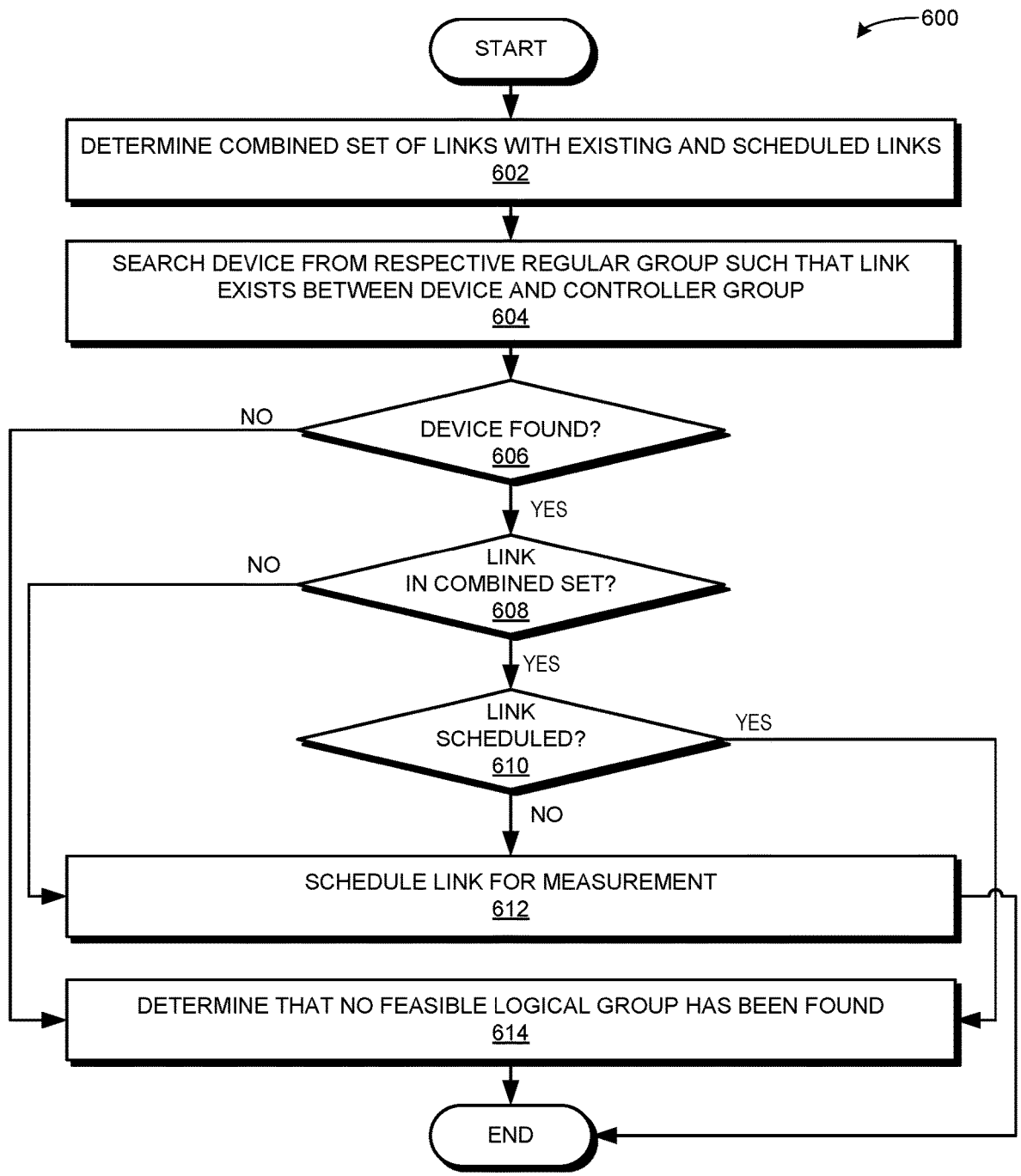
FIG. 6A presents a flowchart illustrating a method of a content distribution system scheduling measurement for a link associated with a controller logical group, in accordance with an embodiment of the present application.

FIG. 6A presents a flowchart 600 illustrating a method of a content distribution system scheduling measurement for a link associated with a controller logical group, in accordance with an embodiment of the present application. During operation, the system determines a combined set of links with existing and scheduled links (operation 602) and searches a device from a respective regular group such that a link exists between the device and the controller group (i.e., at least one device in the controller group) (operation 604). The system then checks whether such a device is found (operation 606).

If such a device is found, the system checks whether the link is in the combined set (operation 608). If the link is in the combined set, the system checks whether the link has been scheduled (operation 610). If the link is not in the combined set (operation 608) or the link has not been scheduled (operation 610), the system schedules the link for measurement (operation 612). If the link has been scheduled or the device has not been found (operation 606), the system determines that no feasible logical group has been found (operation 614).

Figure 6B:
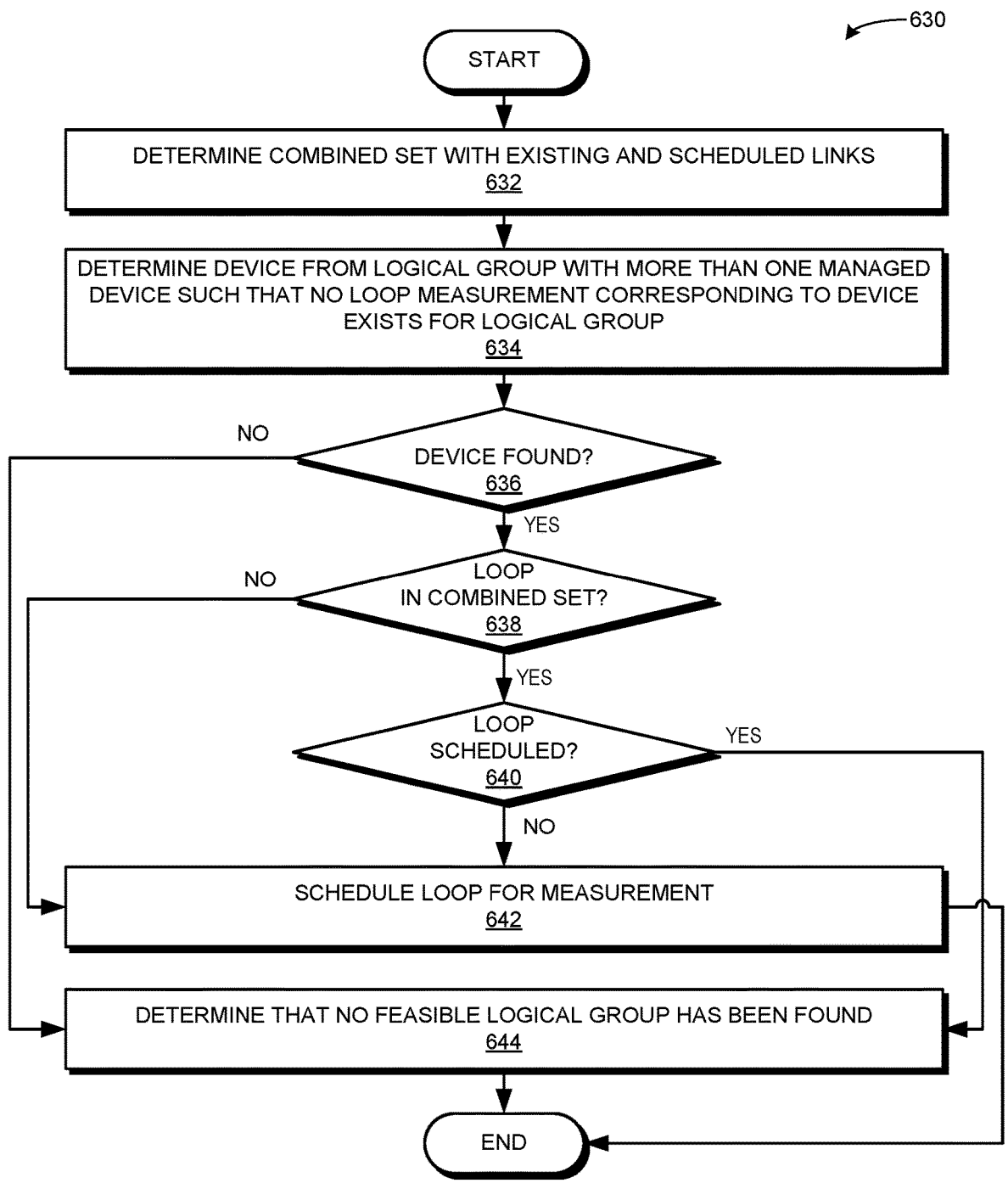
FIG. 6B presents a flowchart illustrating a method of a content distribution system scheduling measurement for a loop in a regular logical group, in accordance with an embodiment of the present application.

FIG. 6B presents a flowchart 630 illustrating a method of a content distribution system scheduling measurement for a loop in a regular logical group, in accordance with an embodiment of the present application. During operation, the system determines a combined set of links with existing and scheduled links (operation 632). The system determines a device from a logical group with more than one managed device such that no loop measurement corresponding to device exists for the logical group (operation 634). The system then checks whether such a device is found (operation 636).

If such a device is found, the system checks whether the loop is in the combined set (operation 638). If the loop is in the combined set, the system checks whether the loop has been scheduled (operation 640). If the loop is not in the combined set (operation 638) or the loop has not been scheduled (operation 640), the system schedules the loop for measurement (operation 642). If the loop has been scheduled or the device has not been found (operation 636), the system determines that no feasible logical group has been found (operation 644).

Figure 6C:
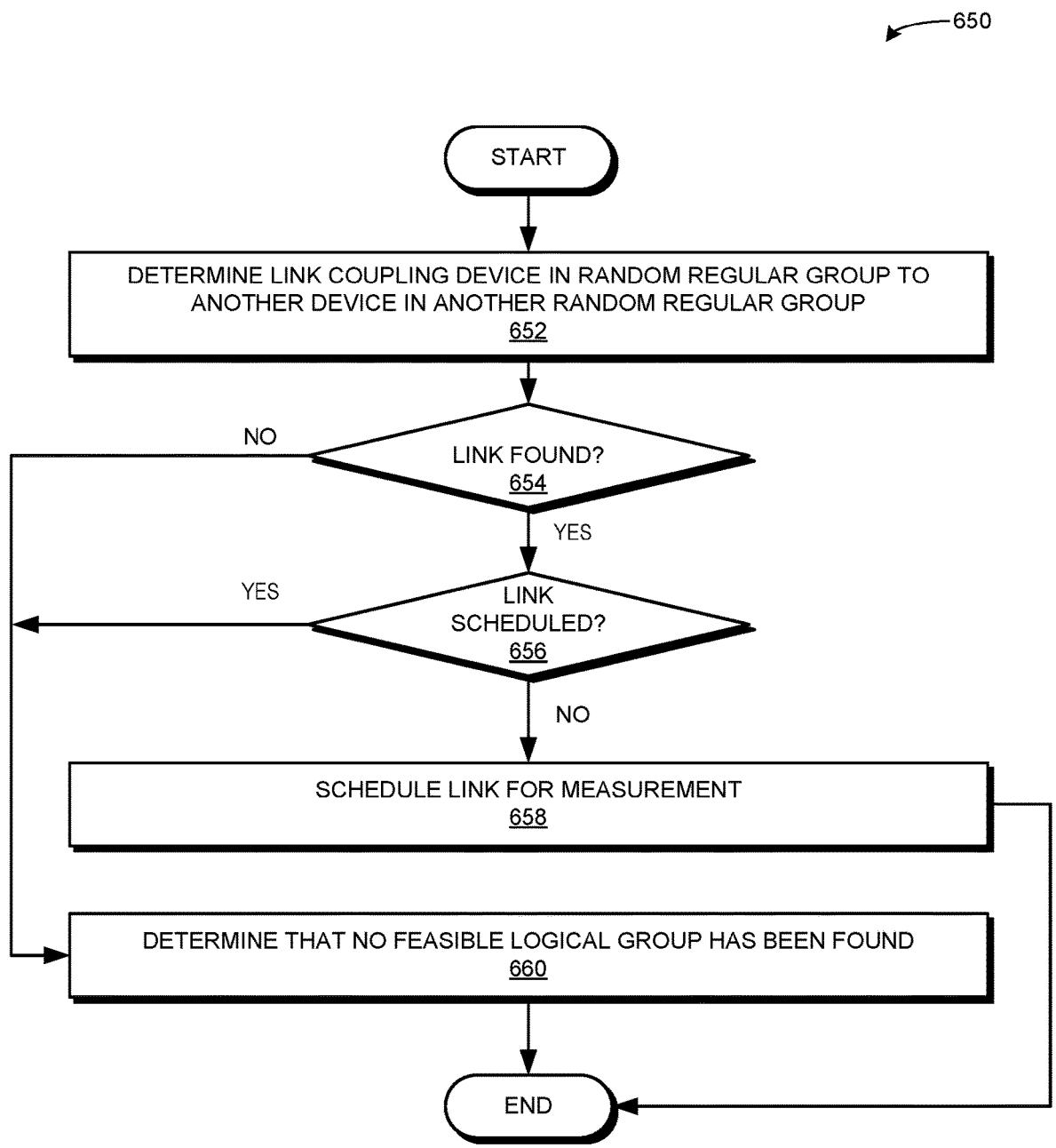
FIG. 6C presents a flowchart illustrating a method of a content distribution system scheduling measurement for a link between a regular logical group pair, in accordance with an embodiment of the present application.

FIG. 6C presents a flowchart 650 illustrating a method of a content distribution system scheduling measurement for a link between a regular logical group pair, in accordance with an embodiment of the present application. During operation, the system determines a link coupling a device in a random regular group to another device in another random regular group (operation 652). The system checks whether such a link is found (operation 654). If such a link is found, the system checks whether the link has been scheduled (operation 656). If the link has not been scheduled (operation 656), the system schedules the link for measurement (operation 658). If the link has been not been found (operation 654) or has been scheduled (operation 656), the system determines that no feasible logical group has been found (operation 660).

Figure 6D:
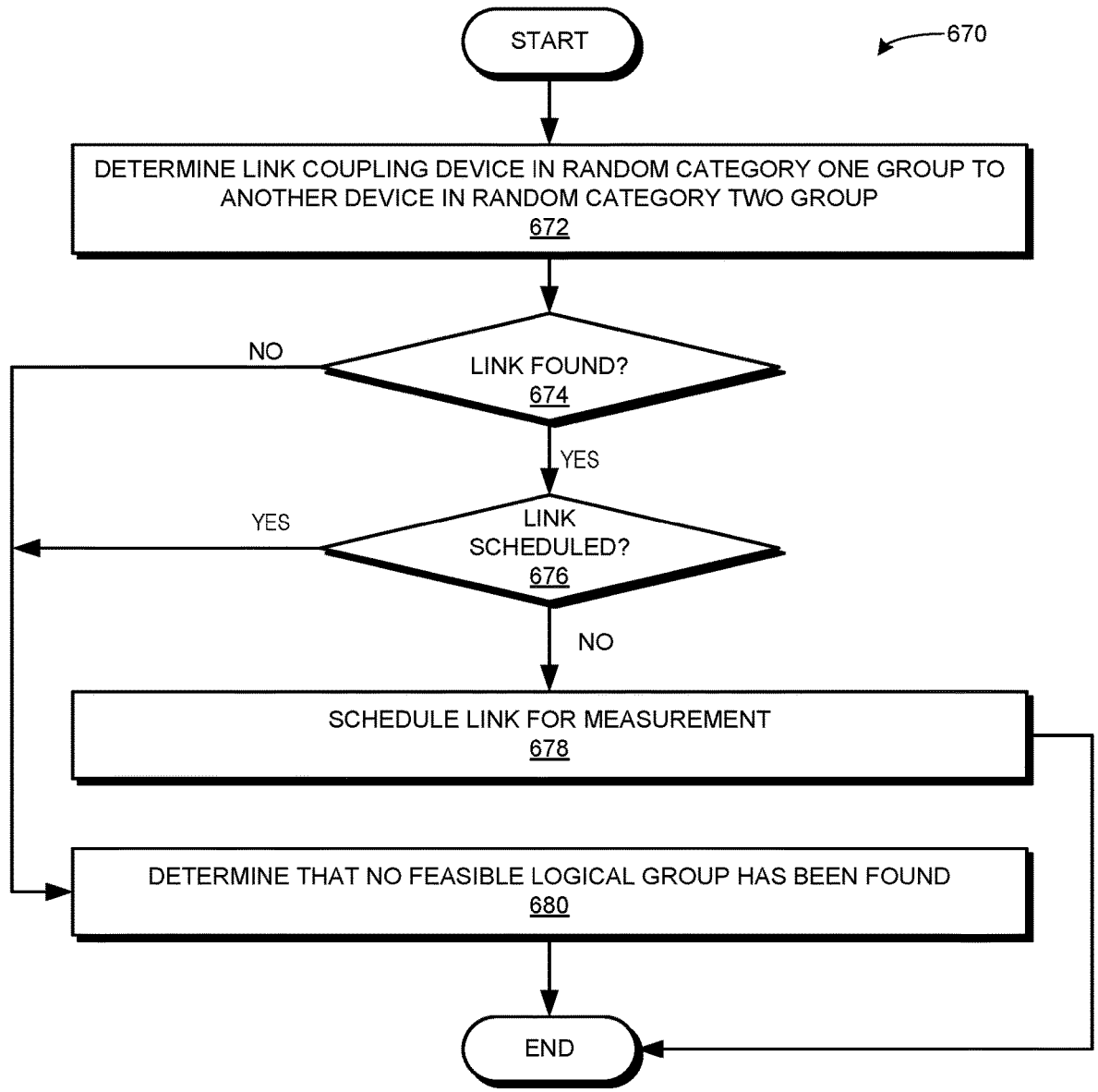
FIG. 6D presents a flowchart illustrating a method of a content distribution system scheduling measurement for a link between clusters, in accordance with an embodiment of the present application.

FIG. 6D presents a flowchart 670 illustrating a method of a content distribution system scheduling measurement for a link between clusters, in accordance with an embodiment of the present application. During operation, the system determines a link coupling a device in a random category one group to another device in another random category two group (operation 672). In some embodiments, the system uses exogenous information associated with the groups to select the category one and category two groups, as described in conjunction with FIG. 1A. The system checks whether such a link is found (operation 674). If such a link is found, the system checks whether the link has been scheduled (operation 676). If the link has not been scheduled (operation 676), the system schedules the link for measurement (operation 678). If the link has been not been found (operation 674) or has been scheduled (operation 676), the system determines that no feasible logical group has been found (operation 680).

Exemplary Computer System and Apparatus

Figure 7:
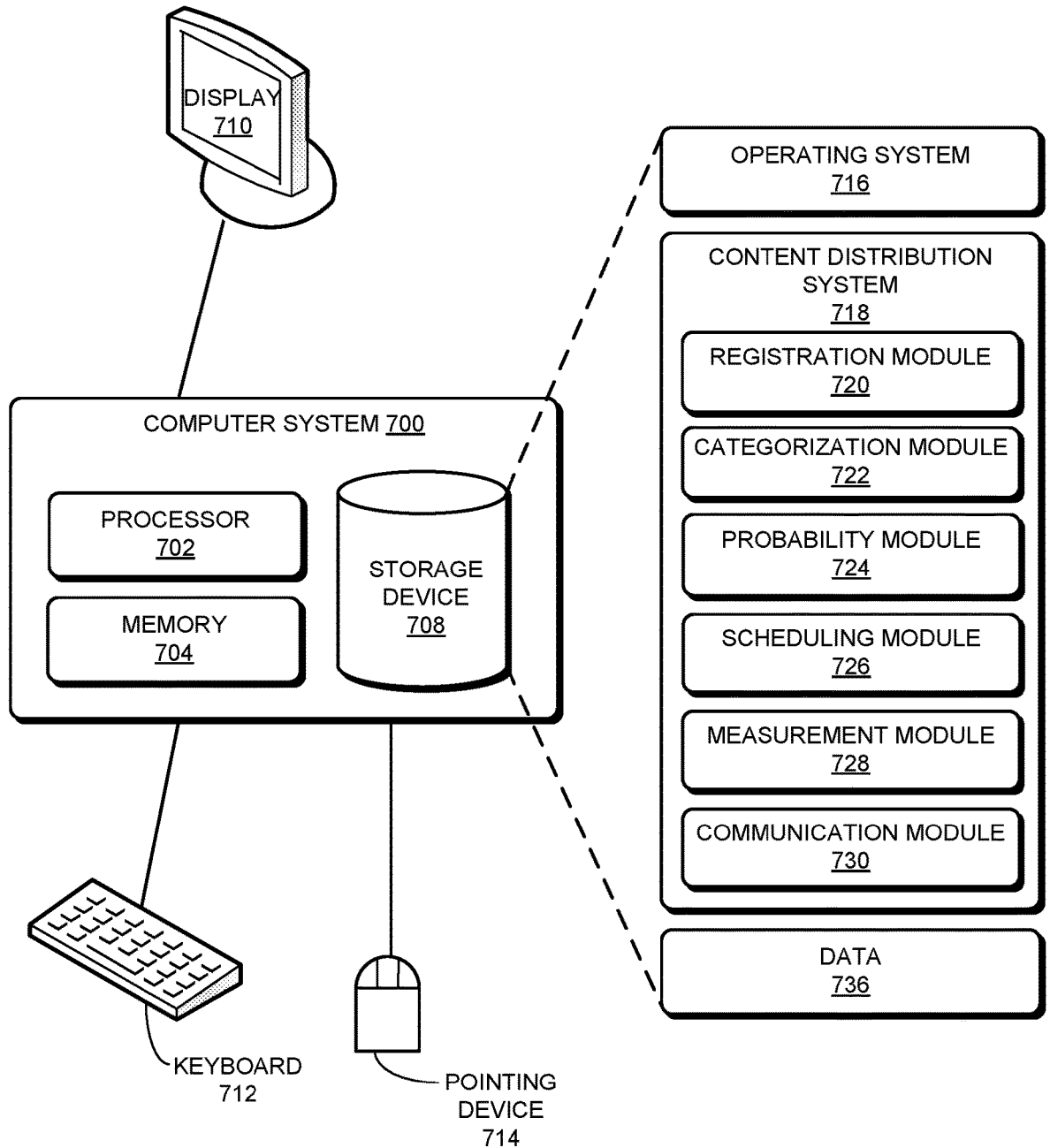
FIG. 7 illustrates an exemplary computer system that facilitates efficient network measurement for distributing content in an enterprise environment, in accordance with an embodiment of the present application.

FIG. 7 illustrates an exemplary computer system that facilitates efficient network measurement for distributing content in an enterprise environment, in accordance with an embodiment of the present application. Computer system 700 includes a processor 702, a memory device 704, and a storage device 708. Memory device 704 can include a volatile memory device (e.g., a dual in-line memory module (DIMM)). Furthermore, computer system 700 can be coupled to a display device 710, a keyboard 712, and a pointing device 714. Storage device 708 can store an operating system 716, a content distribution system 718, and data 736. Content distribution system 718 can facilitate the operations of one or more of: controller 140, source device 102, group heads 104, 106, 108, 144, and 146, source device 102, and receiving devices 104 and 106.

Content distribution system 718 can include instructions, which when executed by computer system 700 can cause computer system 700 to perform methods and/or processes described in this disclosure. Specifically, content distribution system 718 can include instructions for discovering and maintaining information of a current set of devices and subnets in the enterprise environment in a node database (registration module 720). Content distribution system 718 can also include instructions for categorizing groups into category one and two groups using exogenous information (categorization module 722). Furthermore, content distribution system 718 can also include instructions for determining probabilities of measurements for a respective link category (probability module 724).

Moreover, content distribution system 718 can also include instructions for scheduling the links for measurement based on the probabilities of measurements (scheduling module 726). Content distribution system 718 can include instructions for performing the scheduled measurements (measurement module 728). Content distribution system 718 may further include instructions for sending and receiving messages (communication module 730). Data 736 can include any data that can facilitate the operations of content distribution system 718.

Figure 8:
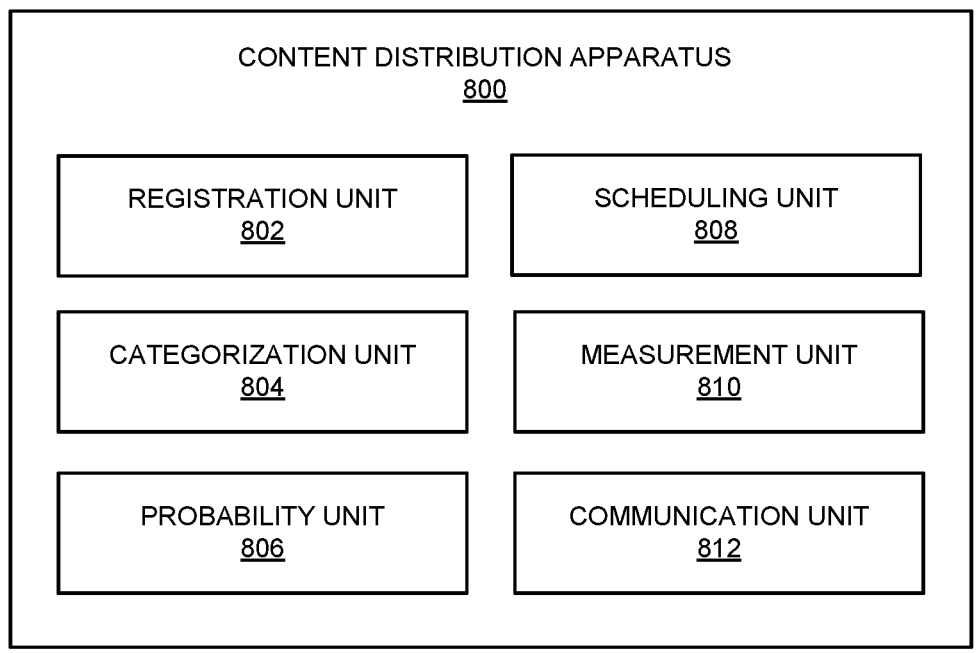
FIG. 8 illustrates an exemplary apparatus that facilitates efficient network measurement for distributing content in an enterprise environment, in accordance with an embodiment of the present application.

FIG. 8 illustrates an exemplary apparatus that facilitates efficient network measurement for distributing content in an enterprise environment, in accordance with an embodiment of the present application. Content distribution apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device that is capable of communicating with other computer systems and/or devices. Specifically, apparatus 800 can comprise units 802-812, which perform functions or operations similar to modules 720-730 of computer system 700 of FIG. 7, including: a registration unit 802; a categorization unit 804; a probability unit 806; a scheduling unit 808; a measurement unit 810; and a communication unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method for facilitating network measurement for dynamic content distribution in an enterprise environment, comprising:
   identifying a plurality of devices managed by a controller of the enterprise environment;
   grouping, by the controller, the plurality of devices into a set of logical groups based on a set of grouping criteria, wherein a respective logical group includes one or more devices of the plurality of devices and a network that couples the one or more devices;
   categorizing the set of logical groups based on exogenous information associated with a respective logical group, wherein the exogenous information is encrypted using a privacy-preserving transformation that allows the controller to find a size of set unions between two devices' exogenous information without learning the exogenous information of the two devices;
   determining a corresponding likelihood of measurement associated with a set of performance parameters for a respective category of links in the enterprise environment, wherein the categories of links in the enterprise environment are determined based on the set of logical groups, and wherein the set of performance parameters comprises at least one of: bandwidth, latency, and utilization; and
   scheduling, for measuring the set of performance parameters, a link belonging to a first link category and a first logical group based on the likelihood of measurement of the first link category and the category of the first logical group.

2. The method of claim 1, wherein the set of logical groups is categorized into a first category corresponding to a first subset of logical groups within a threshold distance to the controller and a second category corresponding to a second subset of logical groups outside of the threshold distance to the controller.

3. The method of claim 1, wherein the exogenous information includes one or more of: time zone information, language and any other locale information, Internet Protocol (IP) subnet information, routing protocol information and service information.

4. The method of claim 1, further comprising selecting one or more group heads for a respective logical group of the set of logical groups, wherein inter-group connections between a first and a second logical groups are connections between the one or more group heads of the first logical group and the one or more group heads of the second logical group.

5. The method of claim 1, wherein the categories of a link include one or more of:
   a link from a random logical group to a source logical group;
   a loop in a random logical group;
   a link between two distinct random logical groups; and
   a link between two categories of logical groups.

6. The method of claim 1, wherein the likelihood of measurement of the first link category is based on a probability of scheduling a link in the first link category.

7. The method of claim 1, further comprising obtaining the exogenous information associated with a respective logical group using message queue (MQ)-based message exchanges.

8. The method of claim 1, further comprising performing the scheduled measurement of the set of performance parameters by:
   sending a set of packets of different sizes via the link, and
   determining the set of performance parameters of the link based on a set of response packets corresponding to the set of packets.

9. The method of claim 8, further comprising:
   obtaining one or more pieces of data from the set of response packets; and
   in response to receiving a minimum number of response packets, calculating a moving average of obtained pieces of data to determine the performance parameters.

10. A non-transitory computer-readable storage medium storing instructions that when executed by a computer cause the computer to perform a method for facilitating dynamic content distribution in an enterprise environment, the method comprising:
    identifying a plurality of devices managed by a controller of the enterprise environment;
    grouping, by the controller, the plurality of devices into a set of logical groups based on a set of grouping criteria, wherein a respective logical group includes one or more devices of the plurality of devices and a network that couples the one or more devices;
    categorizing the set of logical groups based on exogenous information associated with a respective logical group, wherein the exogenous information is encrypted using a privacy-preserving transformation that allows the controller to find a size of set unions between two devices' exogenous information without learning the exogenous information of the two devices;
    determining a corresponding likelihood of measurement associated with a set of performance parameters for a respective category of links in the enterprise environment, wherein the categories of links in the enterprise environment are determined based on the set of logical groups, and wherein the set of performance parameters comprises at least one of: bandwidth, latency, and utilization; and
    scheduling, for measuring the set of performance parameters, a link belonging to a first link category and a first logical group based on the likelihood of measurement of the first link category and the category of the first logical group.

11. The computer-readable storage medium of claim 10, wherein the set of logical groups is categorized into a first category corresponding to a first subset of logical groups within a threshold distance to the controller and a second category corresponding to a second subset of logical groups outside of the threshold distance to the controller.

12. The computer-readable storage medium of claim 10, wherein the exogenous information includes one or more of: time zone information, language and any other locale information, Internet Protocol (IP) subnet information, routing protocol information, and service information.

13. The computer-readable storage medium of claim 10, wherein the method further comprises selecting one or more group heads for a respective logical group of the set of logical groups, wherein inter-group connections between a first and a second logical groups are formed between the one or more group heads of the first logical group and the one or more group heads of the second logical group.

14. The computer-readable storage medium of claim 10, wherein the categories of a link include one or more of:
- a link from a random logical group to a source logical group;
- a loop in a random logical group;
- a link between two distinct random logical groups; and
- a link between two categories of logical groups.

15. The computer-readable storage medium of claim 10, wherein the likelihood of measurement of the first link category is based on a probability of scheduling a link in the first link category.

16. The computer-readable storage medium of claim 10, further comprising obtaining the exogenous information associated with a respective logical group using message queue (MQ)-based message exchanges.

17. The computer-readable storage medium of claim 10, wherein the method further comprises performing the scheduled measurement of the set of performance parameters by:
- sending a set of packets of different sizes via the link; and
- determining the set of performance parameters of the link based on a set of response packets corresponding to the set of packets.

18. The computer-readable storage medium of claim 17, wherein the method further comprises:
- obtaining one or more pieces of data from the set of response packets; and
- in response to receiving a minimum number of response packets, calculating a moving average of obtained pieces of data to determine the performance parameters.

* * * * *